United States Patent
Deshpande et al.

(10) Patent No.: US 10,127,251 B2
(45) Date of Patent: Nov. 13, 2018

(54) ORGANIZING ON-DISK LAYOUT OF INDEX STRUCTURES TO SUPPORT HISTORICAL KEYWORD SEARCH QUERIES OVER TEMPORALLY EVOLVING DATA

(71) Applicant: International Business Machines Corporation, Armonk, NY (US)

(72) Inventors: Prasad M. Deshpande, Bangalore (IN); Animesh Nandi, Bangalore (IN); Narendran Sachindran, Bangalore (IN); Suriya Subramanian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 14/795,223

(22) Filed: Jul. 9, 2015

(65) Prior Publication Data
US 2017/0011073 A1   Jan. 12, 2017

(51) Int. Cl.
*G06F 17/30*   (2006.01)

(52) U.S. Cl.
CPC .. *G06F 17/30303* (2013.01); *G06F 17/30309* (2013.01)

(58) Field of Classification Search
CPC ............... G06F 17/30303; G06F 17/30309
USPC .......................................................... 707/663
See application file for complete search history.

(56) References Cited

U.S. PATENT DOCUMENTS

| | | | |
|---|---|---|---|
| 8,078,394 B2 | 12/2011 | Wang et al. | |
| 2009/0043486 A1* | 2/2009 | Yang ................. | G01C 21/3492 701/117 |
| 2014/0156642 A1* | 6/2014 | Johnson ............ | G06F 17/30091 707/722 |

OTHER PUBLICATIONS

Anand et al., Index maintenance for time-travel text search. In Proc. of the 35th International ACM SIGIR Conference on Research and Development in Information Retrieval, pp. 235-244, 2012.
Anand et al., Temporal index sharding for space-time efficiency in archive search. In SIGIR (2011.
Barbay et al., An experimental investigation of set intersection algorithms for text searching. In Journal of Experimental Algorithmics (JEA), vol. 14 (2009).
Beckmann et al., The r*-tree: An efficient and robust access method for points and rectangles. In SIGMOD (1990).

(Continued)

*Primary Examiner* — Joshua Bullock
(74) *Attorney, Agent, or Firm* — Ryan, Mason & Lewis, LLP

(57) ABSTRACT

Methods, systems, and computer program products for organizing on-disk layout of index structures are provided herein. A method includes organizing an on-disk corpus of data index structures; partitioning each data index structure into an active and/or latest state data partition and an archived data partition; sub-partitioning each of the archived data partitions into sub-partitions based on exact lifespan of each data item; executing a search query that includes temporal predicates and keyword predicates across the corpus by: pruning a collection of identified items of data from the corpus that contain the keyword predicates using range metadata associated with the temporal predicates to generate a pruned list of data items; and performing a list intersection operation on the data index structures to generate a list of common data items from the pruned list; retrieving the common data items from the active and/or latest state data partitions and the archived data sub-partitions.

17 Claims, 13 Drawing Sheets

(56) References Cited

OTHER PUBLICATIONS

Berberich et al., A time machine for text search. In SIGIR (2007).
Chen et al., Spatial keyword query processing: And experimental evaluation. In VLDB (2013).
Christoforaki et al., Text vs. space: efficient geo-search query processing. In CIKM (2011).
Gunadhi et al., Efficient indexing methods for temporal relations. In TKDE (1993).
Guttman, A. A dynamic index structure for spatial searching. In SIGMOD (1984).
He et al., Faster temporal range queries over versioned text. In SIGIR (2011).
He et al., Compact full-text indexing of versioned document collections. In CIKM (2009).
He et al., Improved index compression techniques for versioned document collections. In CIKM (2010).
Kane et al., Skewed partial bitvectors for list intersection. In SIGIR (2014).
GitHub, Linux source code. hfips://github.com/torvalds/linux.git, Oct. 4, 2016, pp. 1-7.
Leung et al., Temporal query processing and optimization in multiprocessor database machines. In VLDB (1992).
Lomet et al., Access methods for multiversion data. In SIGMOD (1989).
Wikipedia, Lucene. https://en.wikipedia.org/w/index.php?title=Lucene&oldid=669202448, Jun. 29, 2015.
Apache, Lucene doc-values. https://cwiki.apache.org/confluence/display/solr/DocValues, Apr. 14, 2015.
Apache, Class Payload. https://web.archive.org/web/20140528044647/http://lucene.apache.org/core/3_0_3/api/all/org/apache/lucene/index/Payload.html., May 28, 2014.
Apache, Class NumericRangeQuery<T extends Number>, https://web.archive.org/web/20130610015111/http://lucene.apache.org/core/4_2_0/core/org/apache/lucene/search/NumericRangeQuery.html, Jun. 10, 2013.
Nievergelt et al., The grid file: An adaptable, symmetric multikey file structure. In TODS (1984).
Salzberg et al., Comparison of access methods for time-evolving data. In Proceedings of ACM Computing Surveys, vol. 31 (1999).
Segev et al., Event-join optimization in temporal relational databases. In VLDB (1989).
Verma et al., Efficient archival time index: A dynamic indexing scheme for temporal data. In Proceedings of International Conference on Computer Systems and Education (1994).
Wikimedia, Data Dumps, Wikipedia dataset. http://meta.wikimedia.org/wiki/Data_dumps, Jan. 5, 2016, pp. 1-7.
Wu et al., A framework for efficient spatial web object retrieval. In VLDB (2012).
Zhou et al., Hybrid index structures for location-based web search. In CIKM (2005).
Zobel et al., Inverted files for text search. In Proceedings of ACM Computing Surveys, vol. 38 (2006).
Kolovson et al., Segment indexes: Dynamic indexing techniques for multi-dimensional interval data. In SIGMOD (1991).

\* cited by examiner

| Name | Temporal query | Temporal Predicate |
|---|---|---|
| snapshot(t) | Snapshot S(t) of versions valid at t | $(birthtime \leq t) \land (deadtime > t)$ |
| alive-all($t_1$, $t_2$) | Valid at ALL points in interval [$t_{min}$, $t_{max}$] | $(birthtime \leq t_{min}) \land (deathtime > t_{max})$ |
| alive-any($t_1$, $t_2$) | Valid at ANY point in interval [$t_{min}$, $t_{max}$] | $(birthtime \leq t_{max}) \land (deathtime > t_{min})$ |
| born($t_1$, $t_2$) | Born at some point in interval [$t_{min}$, $t_{max}$] | $(t_{min} \leq birthtime \leq t_{max})$ |
| died($t_1$, $t_2$) | Died at some point in interval [$t_{min}$, $t_{max}$] | $(t_{min} \leq deathtime \leq t_{max})$ |
| transient($t_1$, $t_2$) | Transient versions in interval [$t_{min}$, $t_{max}$] | $(t_{min} \leq birthtime \leq t_{max}) \land (t_{min} \leq deathtime \leq t_{max})$ |
| common($t_1$, $t_2$) | $S(t_{min}) \cap S(t_{max})$ | $(birthtime \leq t_{min}) \land (deathtime > t_{max})$ |
| positivediff($t_1$, $t_2$) | $S(t_{max}) \setminus S(t_{min})$ | $(t_{min} \leq birthtime \leq t_{max}) \land (deathtime > t_{max})$ |
| negativediff($t_1$, $t_2$) | $S(t_{min}) \setminus S(t_{max})$ | $(birthtime < t_{min}) \land (t_{min} \leq deathtime \leq t_{max})$ |

FIG. 1

ORGANIZING ON-DISK LAYOUT OF INDEX STRUCTURES TO SUPPORT HISTORICAL KEYWORD SEARCH QUERIES OVER TEMPORALLY EVOLVING DATA

FIELD

The present application generally relates to information technology, and, more particularly, to data management techniques.

BACKGROUND

In data analytics, many analytic use-cases can be powered by the ability to go back in time (that is, time-travel) and analyze the state of a system at some specific point (or time interval) in the past via a free-form keyword or text search. Characteristics of temporally evolving data include each data record (or item) having a time-invariant attribute serving as a unique primary key, and each data record having multiple attributes. Additionally, each data record can evolve over time into successive versions as a result of a create action (which results in the first version of the given data item), an update action (wherein any of the non-primary attributes are updated, resulting in a new version of the given data item), and/or a delete action (which results in the last version of the given data item). Also, the mutation intervals between successive versions can be arbitrary, and all versions of all data items need to be retained in order to support historical queries at arbitrary points in time in the past.

A query commonly includes a temporal predicate denoting an arbitrary historic time (t), which constrains the query to be evaluated over those versions of data items that are "alive" or "active" versions at time (t). A query can also commonly include additional Lucene™-style search predicates over the structured and/or unstructured attributes of the data items.

SUMMARY

In one aspect of the present invention, techniques for organizing the on-disk layout of index structures to support historical keyword search queries over temporally evolving data are provided. An exemplary computer-implemented method can include steps of organizing an on-disk corpus of multiple data index structures to support one or more queries over temporally evolving data, wherein the multiple data index structures comprise at least (i) a data item birth-time index, (ii) a data item death-time index, and (iii) an inverted index and/or postings list per keyword; partitioning each of the multiple data index structures into (i) an active and/or latest state data partition and (ii) an archived data partition; and sub-partitioning each of the archived data partitions into multiple sub-partitions based on an exact lifespan of each item of the archived data. The method further includes executing a search query that includes (i) one or more temporal predicates and (ii) one or more keyword predicates across the on-disk corpus by: pruning a collection of identified items of data from the on-disk corpus that contain the one or more keyword predicates using range metadata associated with the one or more temporal predicates to generate a pruned list of data items; and performing a list intersection operation on at least (i) the data item birth-time index and (ii) the data item death-time index to generate a list of common data items from the pruned list of data items. Additionally, the method includes retrieving the common data items from one or more of (i) the active and/or latest state data partitions and (ii) the archived data sub-partitions.

In another aspect of the invention, an exemplary computer-implemented method can include steps of organizing an on-disk corpus of multiple data index structures to support one or more queries over temporally evolving data, wherein the multiple data index structures comprise at least (i) a data item birth-time index, (ii) a data item death-time index, and (iii) an inverted index and/or postings list per keyword; partitioning each of the multiple data index structures into (i) an active and/or latest state data partition and (ii) an archived data partition; and sub-partitioning each of the archived data partitions into multiple sub-partitions based on an approximate lifespan of each item of the archived data. The method further includes executing a search query that includes (i) one or more temporal predicates and (ii) one or more keyword predicates across the on-disk corpus by: pruning a collection of identified items of data from the on-disk corpus that contain the one or more keyword predicates using range metadata associated with the one or more temporal predicates to generate a pruned list of data items; and performing a list intersection operation on at least (i) the data item birth-time index and (ii) the data item death-time index to generate a list of common data items from the pruned list of data items. Additionally, the method includes retrieving the common data items from one or more of (i) the active and/or latest state data partitions and (ii) the archived data sub-partitions.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a query table according to an example embodiment of the invention;

DETAILED DESCRIPTION

Figure 2:
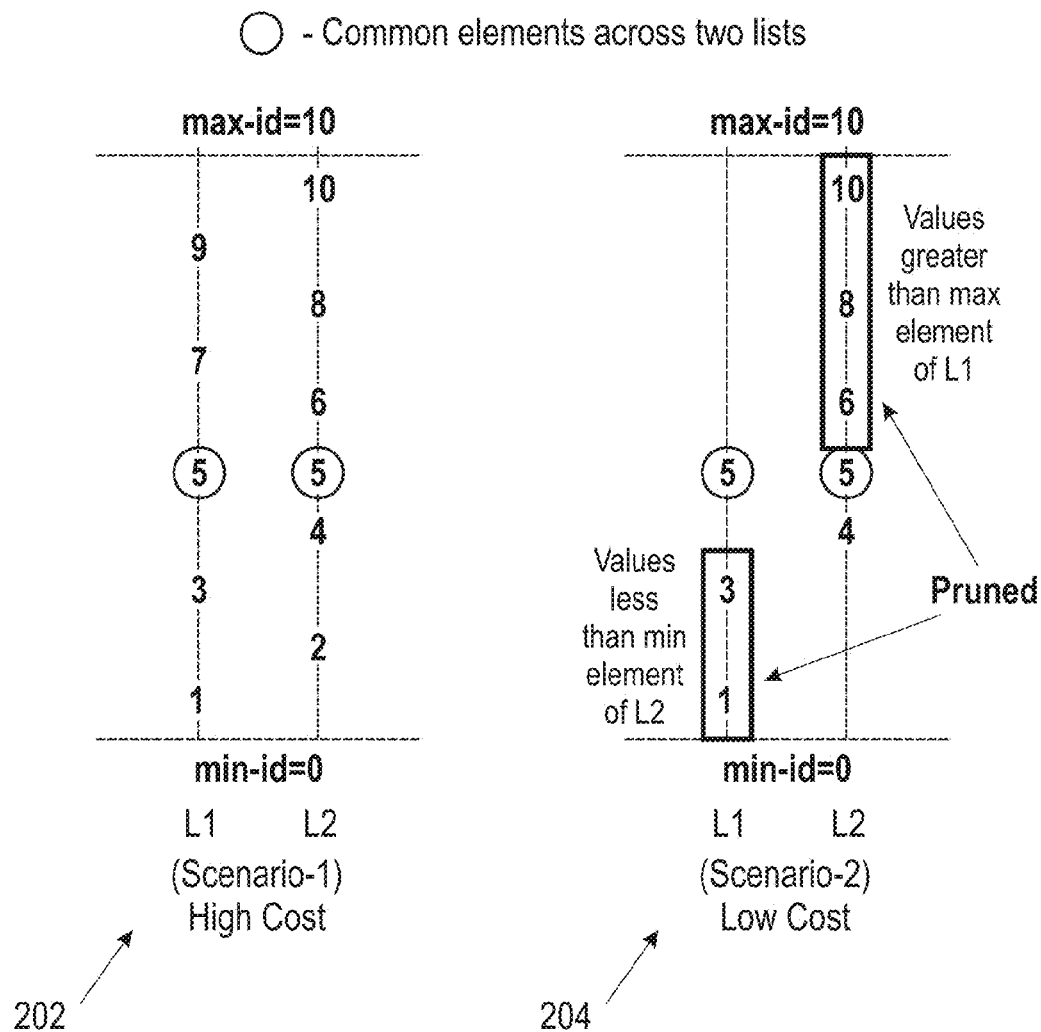
FIG. 2 is a diagram illustrating two list intersection algorithm scenarios, according to an example embodiment of the invention.

As described herein, an aspect of the present invention includes techniques for organizing the on-disk layout of index structures to efficiently support historical queries over temporally evolving data. A time-travel text search over a document collection that evolves over time is useful in various contexts, such as web archive research, problem root-cause diagnosis in a data center, provenance applications, etc. Queries made by these applications vary from pure keyword search queries, pure temporal predicate queries, and a combination of the two. Supporting these query classes efficiently involves different index organization structures optimized for their respective access patterns. In particular, single-attribute index structures can efficiently answer queries on a single-attribute (for example, keyword-only), while a multi-attribute index structure can efficiently answer queries with joint predicates. At least one embodiment of the invention includes efficiently handling different query classes using the same index organization structure.

One or more embodiments of the invention include implementing single-attribute index structures and computing intersections of postings lists from these indexes when evaluating joint predicate queries. Such an embodiment includes exploiting the fact that the search-index assigns record identifiers to document revisions in chronological order of index time and performs efficient postings list intersections using skipping. By further partitioning the document revision space based on the lifespan of the documents, at least one embodiment of the invention includes avoiding intersections with large fractions of the postings lists.

An example embodiment of the invention can be implemented in the domain of information technology (IT) operational analytics, wherein root-cause diagnostics and forensics are notable challenges. Such an embodiment can be enabled, for example, via a time-travel search on historical machine data that are collected periodically in real-time by a cloud data center monitoring infrastructure. The data can pertain to various elements related to servers, such as operating systems, disks, configuration files, packages, connections and/or processes. Because the state of the servers continues to change, the documents representing these elements evolve over time and need to be tracked for problem determination and analysis. In many other domains, such provenance applications, one or more embodiments of the invention can be implemented via the primitive of a time-travel text search.

Such embodiments can be utilized in connection with data items in the form of unstructured text documents or partially structured key-value pairs. In such a scenario, each data item or document gets created and undergoes multiple updates, each creating a new document version before finally getting deleted. The validity interval of each document version is represented as [birth-time, death-time], wherein birth-time is the time when that version was created as a result of an update to its previous version, and death-time is the time when that version was updated again resulting in the creation of its next version. Note that unless deleted explicitly, the last version of every document has its death-time as 1 (that is, infinity). In this type of create/update/delete data model, note that each data item or document has at most a single version that is valid at any point in time t.

Over such a temporally-versioned document collection, the following classes of queries can be expected: (1) keyword-only queries, which include pure keyword search queries on the content of document versions; (2) temporal only queries, which include temporal predicates on the lifetimes of versions such as the versions valid at time t or versions that changed (or remained unchanged) within the time interval[$t_{min}$, $t_{max}$]; and (3) keyword and temporal queries, which include a combination of keyword searches and temporal predicates.

Accordingly, at least one embodiment of the invention includes organizing the on-disk layout of index structures for birth-time, death-time, and search attributes, in order to support a variety of parameters. Such parameters can include ingestion costs, storage costs, and query flexibility. Ingestion costs include indexing overhead, which should be proportional to the volume of total data items. Storage costs include the size of the on-disk index structures, which should be proportional to the volume of total data items ingested. Additionally, query flexibility can include the ability to efficiently support different types of query access patterns, such as a query involving only temporal predicates, a query involving only search attribute predicates, a query involving both temporal and search predicates, and queries that involve an arbitrary combination of birth-time, death-time, and search attributes.

As described herein, one or more embodiments of the invention are detailed via various terminology. For example, an inverted index, as used herein, includes a mapping from terms to document identifiers (IDs) containing that term. The map entry for a term can have its corresponding document IDs stored in a data structure referred to as postings list for that term. Additionally, a postings list includes document IDs in a sorted order, and also contains an additional metadata structure referred to as a skip-list that enables efficient skipping to a particular document ID in the sorted list.

Also, as used herein, query evaluation includes obtaining the postings list (or multiple sub-lists) corresponding to the temporal index, and obtaining the postings list for each search term in the query. The query can be answered via postings list intersections and union operations.

As detailed herein, at least one embodiment of the invention includes partitioning a document revision space into (i) a latest section (also referred to as "LS" herein) and (ii) an archival index (also referred to as "AS" herein). Such an embodiment can additionally include partitioning the document revision space into (i) a latest section and (ii) a lifespan-partitioned archival index. A latest state partition includes those document versions with a death-time=infinity (that is, the latest state or unexpired version of each document). Further, such an embodiment can include carrying out temporal-predicate post-filtering on a pruned-search list instead of intersecting with temporal list.

One or more embodiments of the invention include using only the range metadata of the temporal lists to dynamically prune the search-list to size O(|T∩S|), wherein T represents a set of items satisfying the temporal predicate, and S represents a set of items satisfying the search predicate. Additionally, O represents an order notation, as would be appreciated by one skilled in the art, used to define complexity of an algorithm. Also, in one or more embodiments of the invention, the variable U represents total items indexed. Subsequently, at least one embodiment of the invention can include carrying out post-filtering of the pruned-search list using the birth-time and/or death-time temporal attributes to obtain desired results.

Accordingly, at least one embodiment of the invention includes implementing a partitioning strategy based on the exact lifespan of documents. Additionally, one or more embodiments of the invention include implementing a partitioning strategy based on an approximate lifespan of documents. Such an embodiment can include utilizing an interval tree, which is a data structure used to efficiently answer temporal-only predicates. The search-index archival partitions can be formed around the successive levels of the interval-tree, which largely represent documents with increasing lifespans. Also, at least one embodiment of the invention includes implementing an indexing strategy using an interval-tree as a temporal-index, and using the interval-tree level at which the temporal attributes are indexed to determine a given partition in which the search-term attributes are indexed.

As also described herein, one or more embodiments of the invention include assigning record IDs (also referred to herein as document IDs) in increasing order of transaction time. Such an assignment scheme can be leveraged to have record IDs of live/active versions in increasing order of birth-time, and/or leveraged to have record IDs of expired versions in increasing order of death-time.

Accordingly, and as further detailed herein, one or more embodiments of the invention include on-disk data layout of index structures, wherein data are separated into the disjoint collections to ensure minimum disk input/output (I/O) while intersecting temporal lists and search lists. Disjoint collections can include, for example, a latest-state collection comprising currently alive (that is, non-expired) data item versions, and a logarithmic number of archival index collections comprising expired versions of data items, which can be partitioned largely based on the lifespan of documents. Achieving such partitioning can be carried out via archival collection partitions based purely on lifespan, as well as via archival collection partitions based on the level of the interval-tree in which the temporal attributes get indexed.

As also detailed herein, one or more embodiments of the invention include implementing a query execution plan that leverages the notion that record IDs are in increasing order of birth-time or death-time to prune search-index postings lists via range ([min, max] document ID of the list) metadata of the temporal lists, followed by post-filtering of search results using document values on birth-time/death-time attributes.

In at least one embodiment of the invention, data records that are alive (those with a death-time of infinity) are accumulated and/or maintained in a separate latest state index, while archived data records (those with a death-time) are accumulated and/or maintained in multiple separate indexes based on lifespan. The number of such archival indexes can correspond with each index covering a lifespan range to match the expected lifespan distribution of the given data. By maintaining the indexes disjoint and not duplicating data, ingestion and storage costs can be proportional to the number of data elements. Because data record IDs are assigned in increasing order of time that the records arrive, such reorganization ensures that identifiers and hence the index structures of records matching a temporal predicate are clustered and span as few disk blocks as possible.

In addition to the reorganization, at least one embodiment of the invention includes relying on the notion that record identifiers increase with time to perform efficient unions and intersections of record lists that match the temporal and term predicates.

In one or more embodiments of the invention, the fundamental data item is an unstructured or partially structured text document identified by a time-invariant key. As detailed herein, each document follows a create/update/delete lifecycle, evolving over time, leading to successive document versions. Birth-time and death-time attributes of a version specify the time-interval during which the version is/was valid. Also, note that each document has at most a single version that is valid at any point in time t.

For a particular document entity that was successively updated at transaction times $t_0, t_1, \ldots, t_n$ (in chronological time order) and thereby resulted in the creation of document versions $v_0, v_1, \ldots, v_n$, the validity intervals of these successive versions are $[t_0, t_1), [t_1, t_2), \ldots, [t_n, \infty)$, respectively. The current unexpired version of the document is the version with a death-time set to the special value $\infty$. For a deleted document, the last version's death-time attribute is the time of deletion.

As noted herein, query classes can include (i) keyword-only queries, (ii) temporal-only queries, and (iii) keyword and temporal queries containing both keyword and temporal predicates. Keyword-only queries support search keywords combined by Boolean operators. Temporal-only queries filter those document versions with birth-time and death-time attributes satisfying temporal predicates. For example, the snap-shot(t) query with predicates (birth-time≤t)^(death-time>t) retrieves all versions valid at time t.

FIG. 1 is a query table 102 according to an example embodiment of the invention. Table 102 lists various queries specified as predicates on birth-time and death-time. Such queries also use various criteria for selection: versions created/updated/deleted in a time-interval (for example, born or died in a time-interval), versions that were valid throughout the time-interval, and versions that were transient in nature (that is, both born and died within that time-interval). In the query class of keyword and temporal queries, a query is a conjunction of a keyword and temporal predicates to search among document versions matching a temporal criterion. A representative query in this class is a snap-shot search (t, k) that further sub-sets on the results of the snap-shot(t) query at a historic point in time t using a keyword predicate k. This query searches on the set of document versions that are valid at time t using a keyword predicate k.

Search index query processing logic leverages the standard inverted index or postings lists index structure, wherein the search-index maintains an inverted index and/or postings list for every distinct term present across all document versions in the corpus. As noted herein, the postings list of a term contains a list of record-identifiers assigned by the indexing engine for the document versions that contain that term. To answer keyword-only queries that include conjunctions and disjunctions of keyword predicates, the search engine performs intersections and unions of the respective term postings lists. To answer combined keyword and temporal queries, temporal search frameworks compute keyword search results and post-filter those document versions satisfying the temporal constraint.

To post-filter results, search indexes look-up the birth-time and death-time attributes maintained as part of the postings list payload or stored in separate document values data structures. Post-filtering incurs I/O proportional to |K|, wherein K, the set of document versions that match the keyword predicate, can be much larger than those versions satisfying the temporal predicate as well.

Accordingly, at least one embodiment of the invention includes using single-attribute index structures to retain performance on single-attribute queries. To evaluate joint-predicate queries, at least one embodiment of the invention includes using list unions and list intersections on single-attribute index structures.

As detailed herein, numerous factors can affect list intersection cost. Text search engines (for example, Apache Lucene™) can implement algorithms and/or techniques for intersecting two sorted lists. In particular, search engines can leverage an additional data structure referred to as a skip-list that enables quickly accessing a desired position of the postings list instead of performing a full scan of the list. List intersection algorithms leverage the skip-list by skipping portions of the list that are guaranteed to not be present in at least one other list being intersected with. However, the effectiveness of the skipping in list intersection algorithms depends on the distribution of the values in the lists.

FIG. 2 is a diagram illustrating two list intersection algorithm scenarios, according to an example embodiment of the invention. FIG. 2 depicts the above-noted dependence using two scenarios: a high-cost scenario 202 and a low-cost scenario 204. The high-cost scenario 202 demonstrates that the cost of list intersection is high if the values in the two lists interleave considerably. However, if the overlap between the ranges of values in the lists is low (as demonstrated in the low-cost scenario 204), then the cost of list intersection is only proportional to the overlap region because the other portions can be pruned away. The implication of FIG. 2 is that the distribution of record identifiers in underlying postings lists would have a significant impact on the cost of list intersection.

By way of example, at least one embodiment of the invention includes implementing a temporal search index as a layer on top of the text-search engine Lucene™. Separate single-attribute index structures are maintained for each of birth-time, death-time, and the keywords. Birth-time and death-time, being numerical attributes, are indexed using tries. As used herein, a "trie" refers to a data structure used to support numeric range queries. Each trie-node of the multi-level trie-structure represents a contiguous numeric-range, with trie-nodes at the leaf levels representing smaller ranges, while those towards the root representing larger ones. The search index treats each trie-node term as a keyword, and maintains a corresponding postings list containing all of the record IDs whose numeric attribute falls within the node's range. Any query containing keyword and temporal predicates is evaluated via the search-index query evaluation plan comprising postings list unions and list intersections.

In one or more embodiments of the invention, temporal search extensions can be implemented to handle additional logic of maintaining birth-time and death-time attributes, as well as to take document entities through their create, update, and delete life cycle. On receiving an update for a document entity with time-invariant key k, at least one embodiment of the invention includes issuing two application programming interface (API) calls to the underlying indexing engine. First, an update to the death-time attribute of the latest version (if any) is issued, changing the attribute from ∞ to the current time, while keeping the other attributes unchanged. Second, a create instruction is issued with the birth-time attribute set to the current time, the death-time attribute set to the special time ∞, and the version's other attributes set equal to the incoming content.

Additionally, record ID distribution includes each document version manifesting as a point, wherein the point's coordinates correspond to the birth-time and death-time attributes of the version, and wherein the point's color (or other indicator) indicates its record ID. The birth-time axis runs from 0 to the current time, while the death-time axis is similar but has an additional point for the special time ∞ that represents versions that are currently alive (that is, unexpired).

Although the underlying indexing engine assigns record IDs in transaction time order, the distribution of record IDs of the document versions depends on whether the indexing engine is append-only or update-in-place. In update-in-place systems, updates to the attributes of an existing record are processed without changing the underlying record ID assigned to that record. For such systems, the record ID of every version is in birth-time order. However, efficiently supporting update-in-place systems can be challenging for search engines because even a change to a single attribute or field of a document version can translate to requiring multiple random accesses into the possibly multiple reverse-index postings list structures into which terms of that field were indexed. Consequently, most search engines, including Lucene™, are designed as append-only systems in order to support high write-throughput at indexing time. Such systems treat an update as a delete instruction followed by a create instruction. As a result, when a document is updated, the record ID of its previous latest version is marked as deleted, and a new document corresponding to the expired version is created with a new record ID. As a result, archival (that is, expired) versions of a document have record IDs in death-time order, while unexpired versions continue to have record IDs in birth-time order.

Figure 3A:
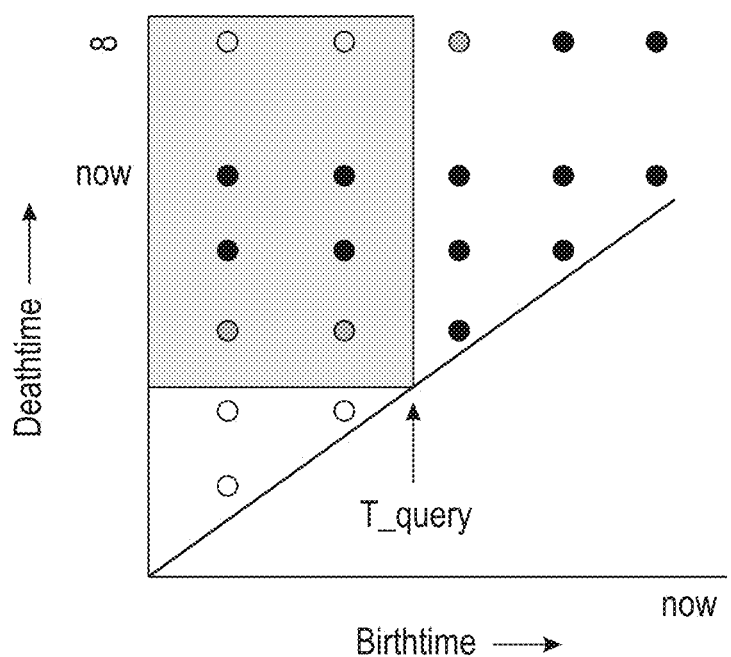
FIG. 3A through FIG. 3G are diagrams illustrating snapshot search query evaluations in an append-only indexing system, according to an example embodiment of the invention.
Figure 3B:
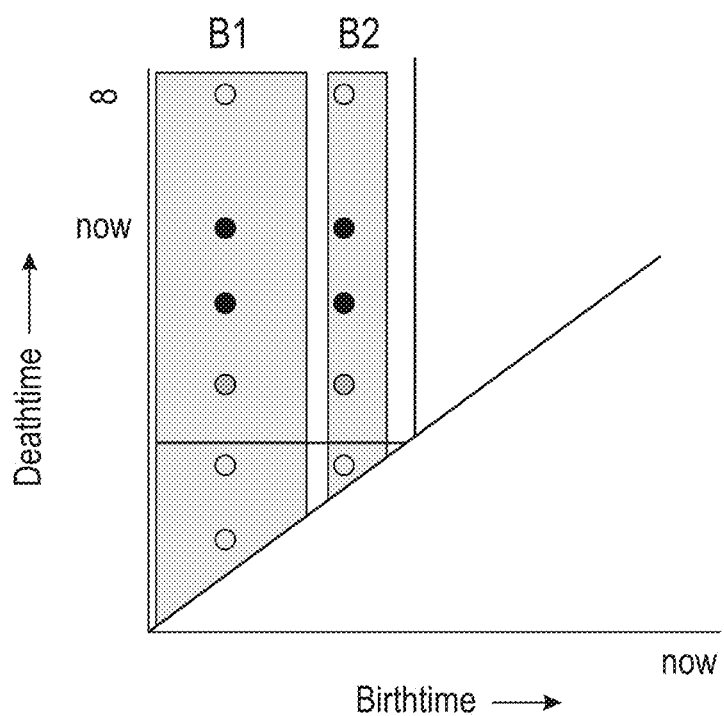
Figure 3C:
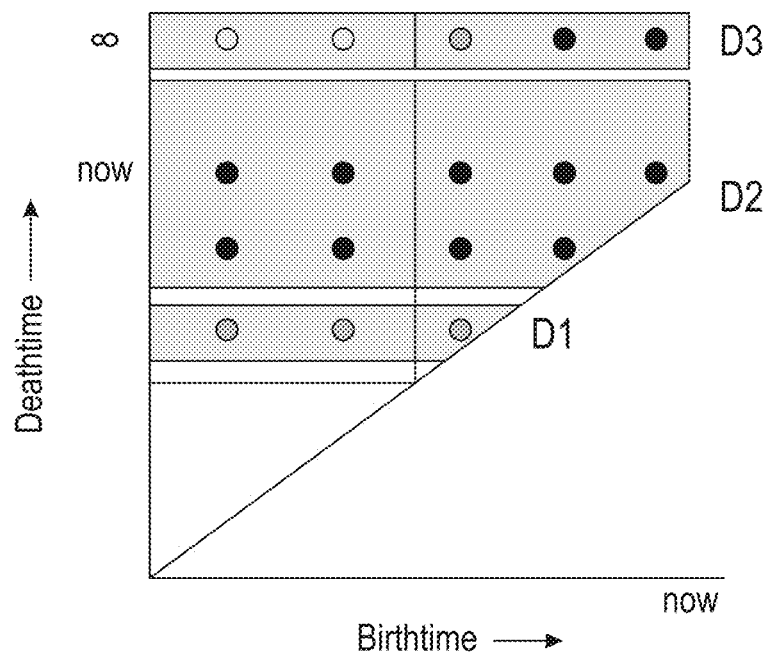
Figure 3D:
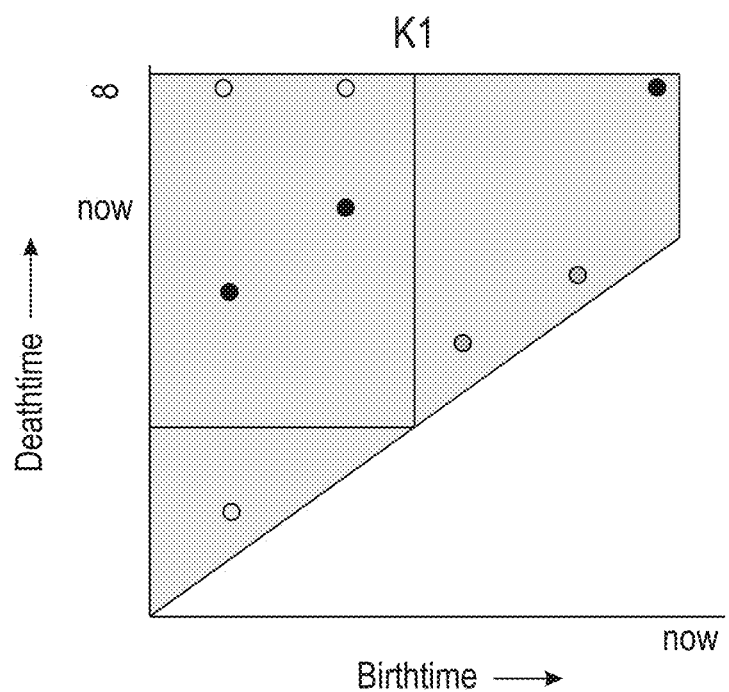
Figure 3E:
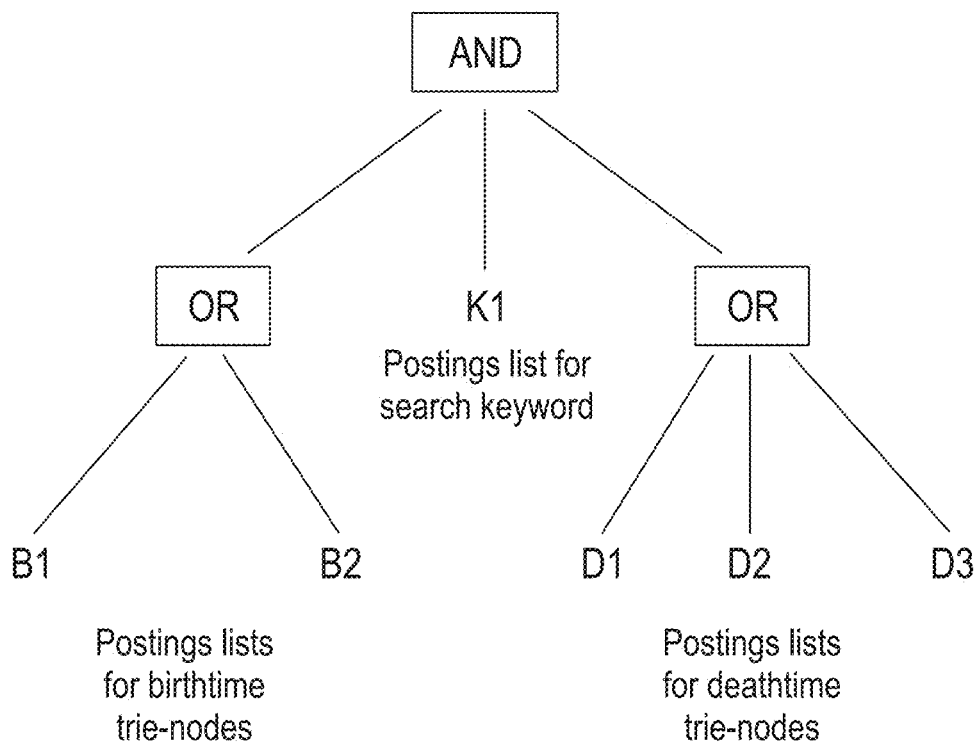
Figure 3F:
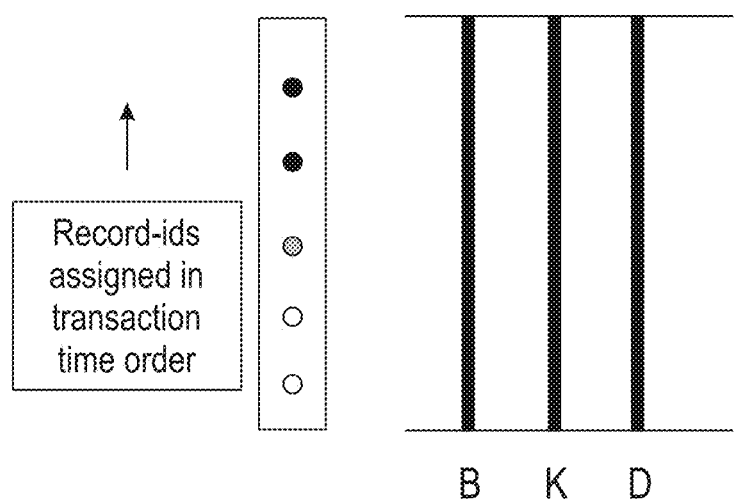
Figure 3G:
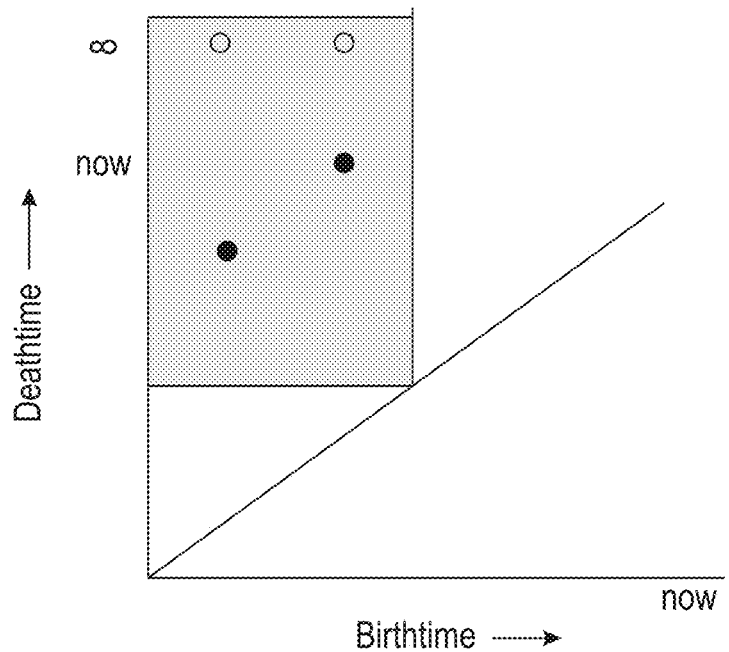

FIG. 3A through FIG. 3G are diagrams illustrating snapshot search query evaluations in an append-only indexing system, according to an example embodiment of the invention. FIG. 3A highlights the region corresponding to the snapshot-search (t, k), which is specified via the temporal predicate ((birth-time<t)^(death-time>t)). Note that out of all record IDs present in this region, only a subset of these satisfy the keyword predicate k, and this subset constitutes the result set as shown in FIG. 3G. FIG. 3B, FIG. 3C, and FIG. 3D show the postings lists corresponding to the birth-time, death-time, and the keyword k, respectively. FIG. 3B and FIG. 3C show the trie-node postings lists satisfying the query predicates for the birth-time and death-time trie, respectively, with the different widths being an illustration of these trie-nodes corresponding to different levels of the trie.

To compute this result set, the search index carries out list unions and list intersections as per the query plan shown in FIG. 3E. The cost of the list intersection (referring to "AND" at root of query plan) is high because this scenario is similar to that of scenario 202 in FIG. 2 wherein each of these three lists (birth-time, death-time and keyword) span the entire range of record IDs themselves, as depicted in FIG. 3F. As a consequence, skipping will not be effective, and all postings lists will be scanned from the beginning to the end, resulting in wasted work.

At least one embodiment of the invention includes partitioning an entire collection into multiple disjoint partitions to reduce the overlap between the postings list corresponding to birth-time, death-time and search-list. To quantify the effectiveness of skipping/pruning, consider, for example, the interaction of a list intersection algorithm with the search keyword's postings list (K) in the snap-shot-search(t, k). By way merely of example, an embodiment of the invention can include categorizing the record IDs in the keyword's postings list into three parts: (i) Result (R), which is the set of record IDs whose temporal attributes satisfy the temporal component of the query and thus are in the result set; (ii) Pruned (P), which is the set of record IDs whose temporal attributes do not satisfy the temporal predicates, but are pruned when performing the list intersection with the temporal (birth-time/death-time) postings lists; and (iii) Wasted (W), which represents (K-R-P), wherein K is the keyword's entire postings list. These record IDs do not satisfy the temporal attributes of the query, but are most likely examined by the list intersection algorithm because they interleave and constitute wasted work with respect to disk I/O and central processing unit (CPU) computation.

Figure 4A:
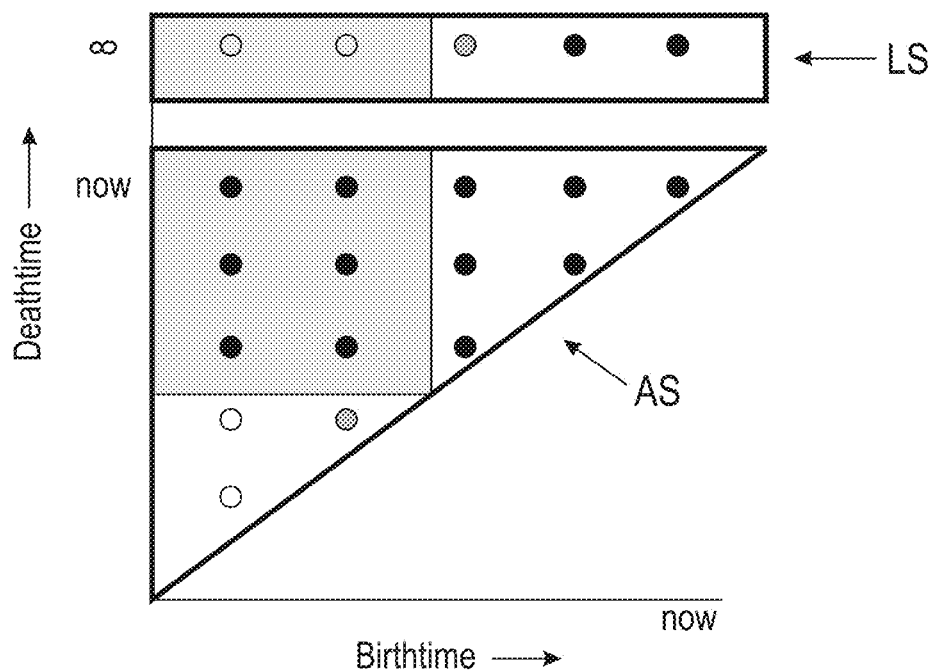
FIG. 4A through FIG. 4C are diagrams illustrating pruning in latest state (LS)+archival (AS) partitioned index, according to an example embodiment of the invention.
Figure 4B:
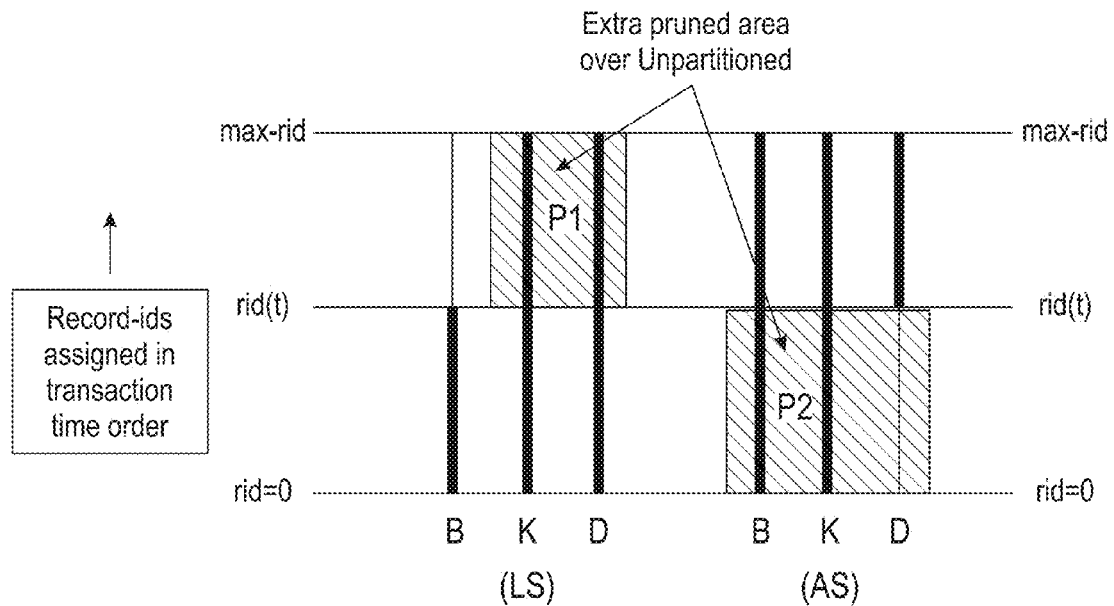
Figure 4C:
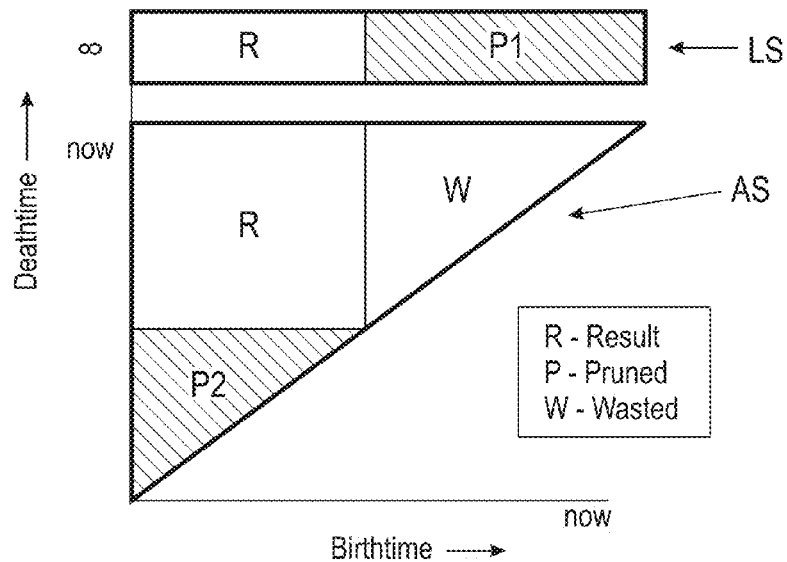

FIG. 4A through FIG. 4C are diagrams illustrating pruning in an LS+AS partitioned index, according to an example embodiment of the invention. As implemented in one or more embodiments of the invention, a partitioning strategy, referred to herein as LS+AS, divides the record ID space into two partitions: a latest partition for current or unexpired versions which have a death-time set to ∞, and an archival partition for archived versions which have a finite death-time attribute, as depicted in FIG. 4A. The final result is the union of versions satisfying the snap-shot-search(t, k) in the two partitions. Note that because these partitions are disjoint, every query can aggregate the results from the two partitions without a concern about removal of duplicates.

This partitioning technique can reduce the list intersection cost by reducing the overlap between the birth-time (B), death-time (D) and search keyword (K) list. Such a technique is depicted in connection with FIG. 4B. As described herein, archival versions of a document have record IDs in death-time order, whereas un-expired (latest) versions have record IDs in birth-time order. By way of illustration, assume that the record ID assigned at time t is rid(t). As used herein, "rid" stands for "record identifier." As also noted here, "docid," which stands for document identifier, is used interchangeably with rid. Consequently, in the latest collection, the record IDs in the birth-time list will range up to a maximum of rid(t). As a consequence, in spite of the death-time and search-term list spanning the entire range of record IDs, large portions of these lists having record ID values greater than rid(t) can be trivially pruned by the list intersection algorithm (because they correspond to scenario 204 of FIG. 2). Similarly, in the archival collection, the record IDs in the death-time list will have a minimum value of rid(t). Consequently, in the archival collection, large portions of the birth-time and search-term postings list having values less than rid(t) can be pruned away.

The resulting benefits of pruning away these non-overlapping portions is depicted in FIG. 4C. The areas marked with P are the portions additionally pruned as compared to the basic un-partitioned approach wherein the entire region of the record ID space was examined by the list intersection algorithm. As shown, the P1 region pruning benefits the death-time and keyword postings lists, whereas the P2 region pruning benefits the birth-time and keyword postings lists.

Figure 5A:
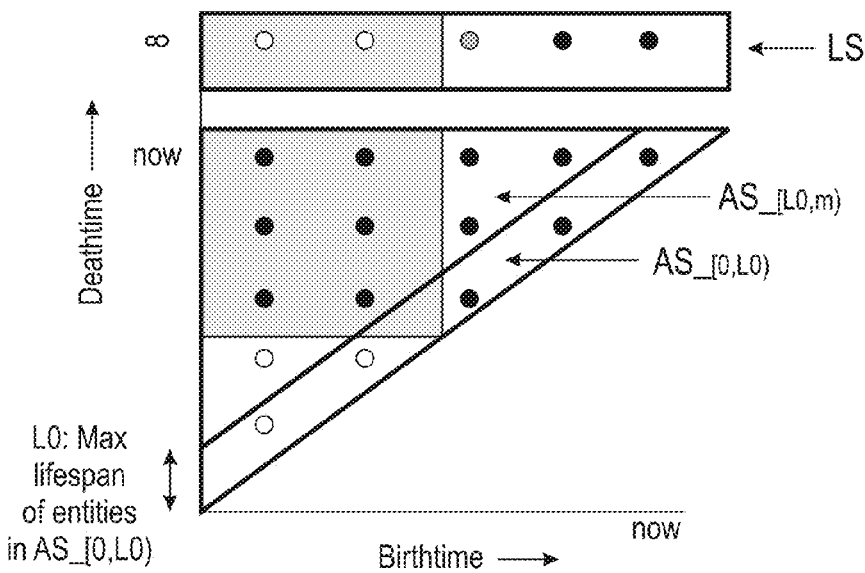
FIG. 5A through FIG. 5C are diagrams illustrating pruning in an LS+Log-archive (AS) partitioned index wherein the number of partitions equals the logarithm of the total or historical time-span, according to an example embodiment of the invention.
Figure 5B:
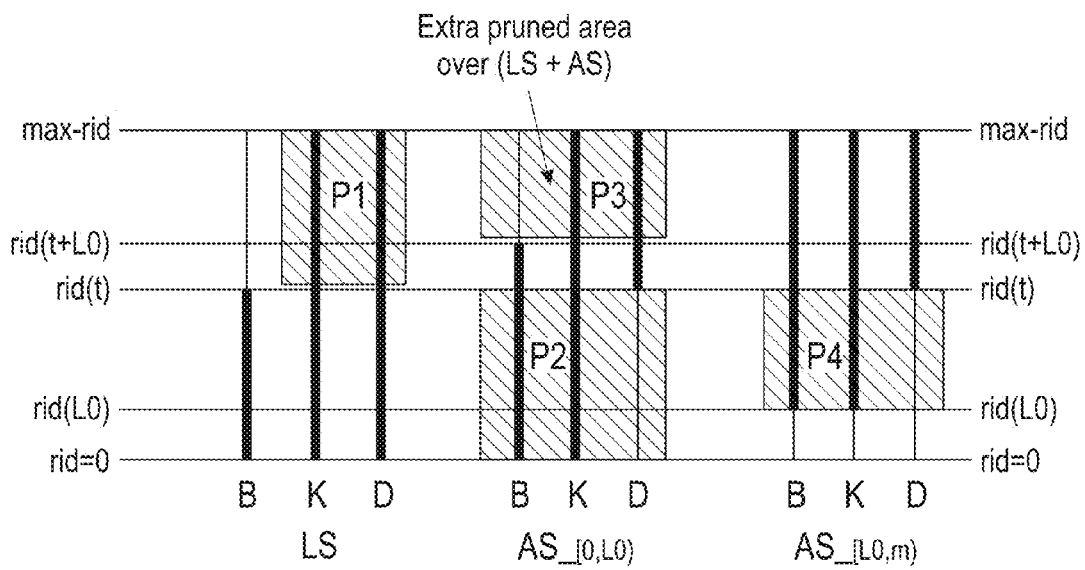
Figure 5C:
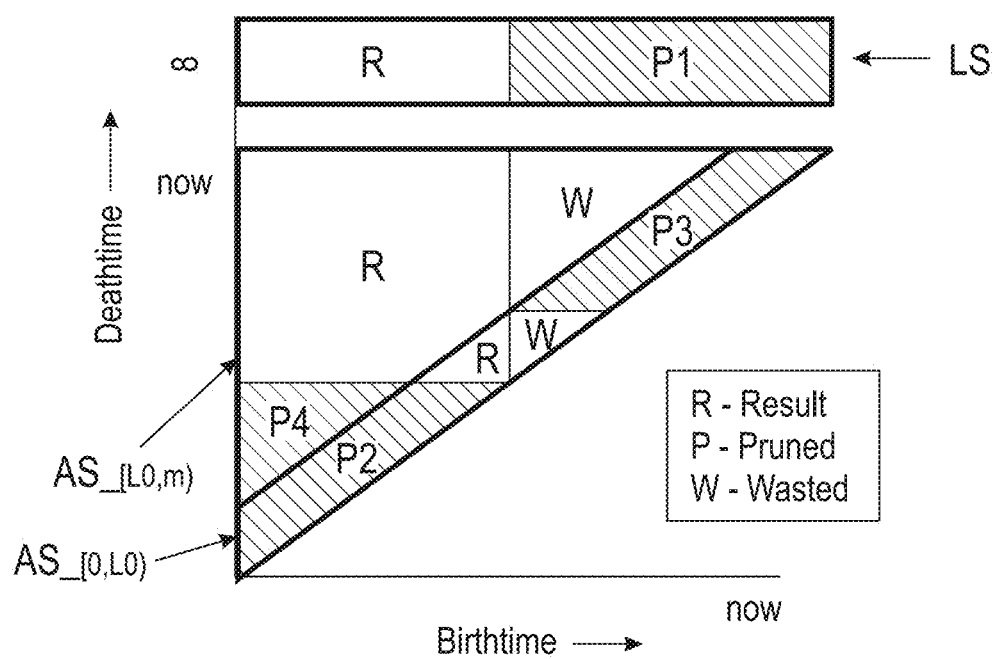

FIG. 5A through FIG. 5C are diagrams illustrating pruning in an LS+Log-AS partitioned index wherein the archival partition is further sub-divided based on the lifespan of document versions, and the number of partitions equals the logarithm of the total or historical time-span, according to an example embodiment of the invention. This leads to more effective pruning and further reduction of the wasted (W) work, as depicted in FIG. 5A through FIG. 5C. By way of example, consider dividing the archival space into two partitions: $AS_{[0,L0)}$ and $AS_{[L0,\infty)}$, as depicted in FIG. 5A. $AS_{[0,L0)}$ comprises short-lived document versions with a maximum lifespan $L_0$, that is, lifespan=(death-time−birth-time)<$L_0$. $AS_{[L0,\infty)}$ comprises the remaining expired document versions with a finite lifespan>$L_0$. $AS_{[0,L0)}$ is the region between the two parallel lines, death-time=birth-time, and death-time=birth-time+$L_0$.

Additionally, again assume that the record ID assigned at time t is rid(t). Also, assume that the record ID assigned at time (t+$L_0$) is rid(t+$L_0$). Consequently, in partition $AS_{[0,L0)}$, the record IDs in the birth-time list will range up to a maximum of rid(t+$L_0$), and the record IDs in the death-time list will have a minimum of rid(t), as depicted in FIG. 5B. Consequently, in the $AS_{[0,L0)}$ collection, the overlap between the lists is a small region of the record ID space in interval [rid(t), rid(t+$L_0$)], and this reduced overlap translates to large portions of these lists getting pruned away. The pruned areas, depicted in FIG. 5C, are larger than those in the LS+AS strategy (as shown in FIG. 4C).

Extending the above embodiment, at least one embodiment of the invention includes further reducing the amount of wasted work by further partitioning $AS_{[L0,\infty)}$ in the same way. Specifically, such an embodiment includes partitioning the archival space into a logarithmic (that is, logarithmic of maximum lifespan or operational time-horizon of the indexing system) number of partitions based on the lifespans of versions. The logarithmic archival collections $AS_{[0,L0)}$, $AS_{[L0,L1)}$, . . . , $AS_{[Ln-2,Ln-1)}$ are created using exponentially increasing maximum lifespan bounds ($L_0, L_1, \ldots, L_{n-1}$), with $L_{i+1}=L_i*$ exponential-factor. The i-th lifespan partition is denoted as $AS_{[l,u)}$, wherein l=$L_{i-1}$ and u=$L_i$, and this partition comprises versions with lifespans in the interval (l, u). Thereby, $AS_{[0,L0)}$ corresponds to the sub-partition containing short-living data items, and $AS_{[Ln-2,Ln-1)}$ corresponds to the sub-partition with expired data items with very long lifespan values. Under heavy tail distributions, for example, having exponentially larger lifespan intervals lead to partitions having a similar number of documents, which enables an efficient trade-off between minimizing the number of index-partitions and minimizing the amount of wasted work.

Because lifespan-based partitioning relies on document versions arriving in transaction time order to efficiently answer queries, indexing documents out of order could affect query performance. However, arrival order does not affect the correctness of query results. In-order arrival can be violated in various scenarios. For example, one such scenario includes a skew in arrival of data from multiple sources and batch upload of historical data. A slight skew does not affect query performance because record IDs assigned around a time period will still be close to each other and temporally close document versions will map to the same or nearby disk blocks. Batch uploads, on the other hand, will not exhibit such a favorable record ID assignment. As such, one or more embodiments of the invention include maintaining a separate partition for batch data, and querying this partition in addition to the others so that batch uploaded data do not affect query performance of the rest of the partitions.

Figure 6A:
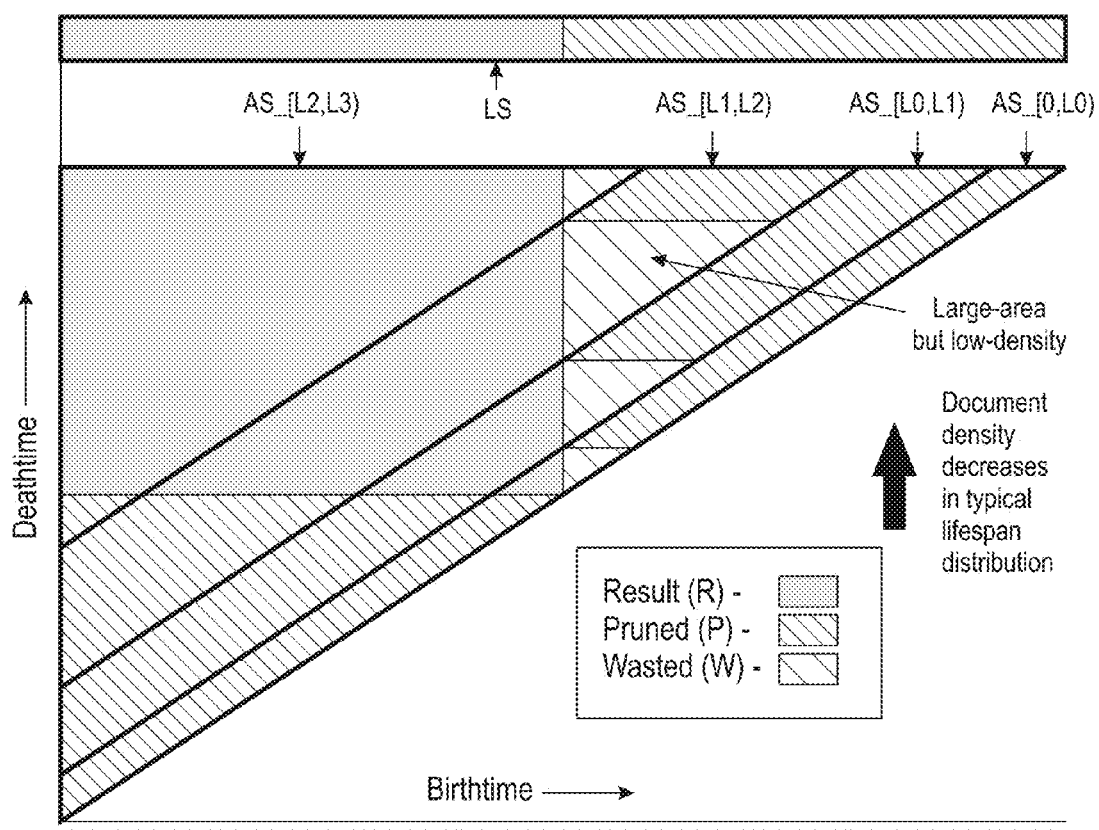
FIG. 6A through FIG. 6B are diagrams illustrating shape, area, and density of wasted work in a lifespan partitioning approach according to an example embodiment of the invention.
Figure 6B:
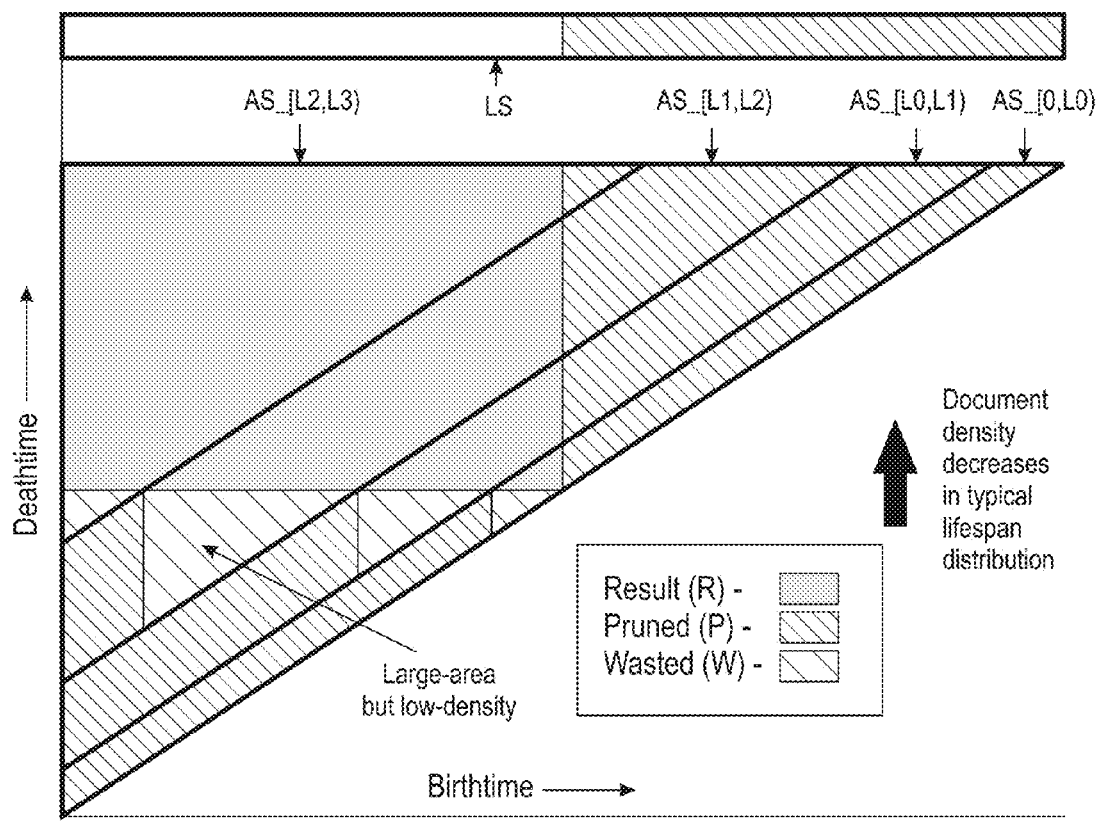

FIG. 6A and FIG. 6B are diagrams illustrating shape, area, and density of wasted work in a lifespan partitioning approach according to an example embodiment of the invention. FIG. 6 shows the unpruned/wasted regions (W regions)

when performing list intersection on a partitioning approach such as detailed herein. While the location of the wasted work regions in the two-dimensional birth-time/death-time space differ between the append-only (FIG. 6A) and the update-in-place (FIG. 6B) indexing system, the shape and area of regions are identical.

Modulo boundary effects that show up when the query time is close to t=0, the wasted work area W is smaller than that of the result set R in all partitions. Though W increases exponentially as the partition size increases, the heavy-tailed nature of lifespan density distribution ensures that the actual amount of wasted work done in terms of CPU computation or disk input/output (I/O), cost(W)=area(W)*density(W), is approximately the same across all partitions. Further, the skipping performed during list intersection ensures that query evaluation accesses even fewer entries in the keyword postings list of the various W regions.

Such a scheme as detailed in connection with one or more embodiments of the invention enables operation under the constraint of having (i) few partitions, wherein fewer partitions reduce the overhead of seek costs from accessing multiple index fragments in different partitions while answering queries, and (ii) disjoint partitions, which enables simple and lightweight techniques for aggregating results across all partitions. Further, with respect to storage overheads, given that disjoint partitions can be used and that every document version is present in exactly one partition, at least one embodiment of the invention includes minimal extra storage overheads. Additionally, one or more embodiments of the invention include implementing indexing logic that is lightweight and can easily work in the setting of real-time ingestion of temporally evolving data, because the decision of to which partition a version should belong is a function of only the version's self-attributes (that is, birth-time/death-time).

Also, in a work volume model, the cost of a query is the sum of the lengths of the unpruned portions of the birth-time, death-time, and keyword postings lists. By treating birth-time and death-time as random variables (X and Y, respectively), and f(x, y) as a continuous density function that describes the number of document versions in the area near the point (birth-time, death-time), the contribution of a postings list to the query cost is the two dimensional integral $\iint_A f(x, y) dx\, dz$ over its unpruned area A.

As an example, consider the evaluation of the snap-shot-search(t, k) under partitioning scheme LS+AS with record IDs assigned by an append-only search index. The cost of computing the results from a postings list (as described herein) is the sum of (i) the lengths of the postings list between rid(0) and rid(t) in the latest partition and (ii) the lengths between rid(t) and rid(inf) in the archival partition. The cost from the death-time list is the integral within the area defined by the boundaries 0≤birth-time<present-time, and t≤death-time<present-time. For the keyword list, this cost is scaled by the selectivity of the search term selectivity (k). Similarly, the costs from the birth-time list is the integral within the area defined by the boundaries 0≤birth-time<t, and t≤death-time<present-time. The costs for all of the lists are summed to give the total cost under the work volume model.

A cost model reflects the benefits of pruning that comes with partitioning the record ID space, but does not account for the differences in the record ID clustering between the birth-time, death-time, and keyword postings lists, and the resultant skipping that would occur while intersecting them.

The work volume with skipping model takes into account the differences in the densities of postings list values across the record ID space, which leads to fine-grained skipping. Consider the cost of intersecting m postings lists $L_1$, $L_2$, ..., $L_m$ of respective lengths $l_1, l_2, ..., l_m$ within the record ID range (a, b). Assuming that each list has its values distributed uniformly within the range (a, b), the cost to intersect the lists is at most $m * min(l_1, l_2, ..., l_m)$ because each step of the list intersection skips at least one element in the shortest list. The work volume with skipping model splits the entire record ID space into multiple chunks to ensure a near-uniform distribution of values within a chunk, and computes a summation of the costs to intersect the postings lists in each chunk. The cost to intersect m postings list $L_1, L_2, ..., L_m$ with respective probability density functions $f_1, f_2, ..., f_m$ is $\Sigma_0^\infty \min(f_1(x), f_2(x) ... f_m(x)) \Delta x$. The work volume with skipping model does not model the fact that the birth-time and death-time postings lists do not reside as single lists but are constructed dynamically by querying birth-time and death-time tries and performing a union of the postings lists from the trie nodes.

At least one embodiment of the invention includes implementing index-partitioning based on how Lucene™ implements tries to support numeric range queries on indexed numeric attributes. Lucene™ implements tries on top of its default postings list abstraction by transforming every numeric attribute's field-name to additionally have a prefix corresponding to the trie-node into which a numeric value should get indexed. While indexing, this transformed field-name is treated as yet another keyword, resulting in separate postings lists per trie-node, thereby emulating the desired effect of having a trie index.

As detailed herein, at least one embodiment of the invention includes implementing a temporal-search layer, which maintains the logic of determining into which partition a particular document version should get indexed by examining the version's birth-time and death-time attributes. Such an embodiment additionally includes generating a partition-prefix corresponding to the partition into which that version should get indexed. This partition-prefix is pre-pended before every field-name of the version's attributes while indexing, thereby creating the desired effect of partitioning the index-structures as per the partitioning strategy. At query time, the temporal search layer accesses desired index partition(s) as per the partitioning strategy by re-writing the query's attributes to additionally have the partition-prefix before the query attributes, for each partition that needs to be accessed.

Figure 7:
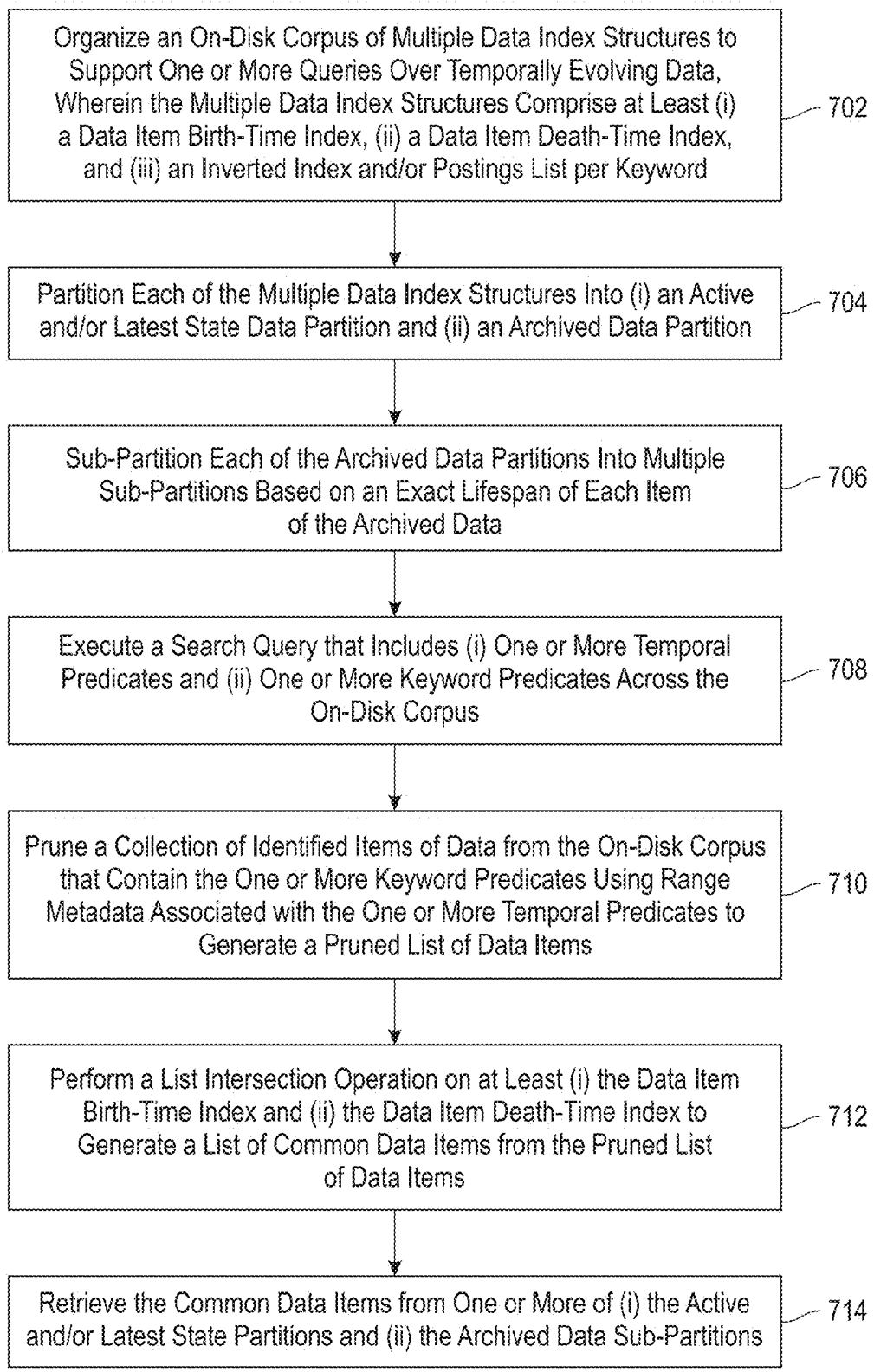
FIG. 7 is a flow diagram illustrating techniques according to an embodiment of the invention.

FIG. 7 is a flow diagram illustrating techniques according to an embodiment of the present invention. Step 702 includes organizing an on-disk corpus of multiple data index structures to support one or more queries over temporally evolving data, wherein the multiple data index structures comprise at least (i) a data item birth-time index, (ii) a data item death-time index, and (iii) an inverted index and/or postings list per keyword. Partitioning each of the multiple data index structures can include placing each item of data in the on-disk corpus in exactly one partition.

Step 704 includes partitioning each of the multiple data index structures into (i) an active and/or latest state data partition and (ii) an archived data partition. Step 706 includes sub-partitioning each of the archived data partitions into multiple sub-partitions based on an exact lifespan of each item of the archived data. In one or more embodiments of the invention, the multiple sub-partitions of the archived data are formed by partitioning a historic time-span encompassing the archived data into a logarithmic number of disjoint partitions comprising successive partitions catering to archived data items which have lifespan values existing within an exponentially increasing lifespan range. That is, the logarithmic archival collections $AS_{[0,L0)}$, $AS_{[L0,L1)}, \ldots, AS_{[Ln-2,Ln-1)}$ are created using exponentially increasing maximum lifespan bounds $(L_0, L_1, \ldots, L_{n-1})$, with $L_{i+1}=L_i*$ exponential-factor. The i-th lifespan partition can be denoted as $AS_{[l,u)}$, wherein $l=L_{i-1}$ and $u=L_i$, and this partition comprises versions with lifespans in the interval [l, u). Thereby, $AS_{[0,L0)}$ corresponds to the sub-partition containing short-living data-items and $AS_{[Ln-2,Ln-1)}$ corresponds to sub-partition with expired data-items with very long lifespan values.

Also, the multiple archived data sub-partitions can include a number of sub-partitions such that each of the multiple sub-partitions cover a lifespan range to match an expected lifespan distribution of the data in the on-disk corpus.

Step 708 includes executing a search query that includes (i) one or more temporal predicates and (ii) one or more keyword predicates across the on-disk corpus.

Step 708 includes step 710 and step 712. Step 710 includes pruning a collection of identified items of data from the on-disk corpus that contain the one or more keyword predicates using range metadata associated with the one or more temporal predicates to generate a pruned list of data items. Step 712 includes performing a list intersection operation on at least (i) the data item birth-time index and (ii) the data item death-time index to generate a list of common data items from the pruned list of data items. The range metadata associated with the one or more temporal predicates can include a minimum data item identifier and a maximum data item identifier, wherein data item identifiers are assigned within the on-disk corpus in increasing order of birth-time of the data item. Additionally, the range metadata associated with the one or more temporal predicates can include a minimum data item identifier and a maximum data item identifier, wherein data item identifiers are assigned within the on-disk corpus in increasing order of death-time of the data item.

Step 714 includes retrieving the common data items from one or more of (i) the active and/or latest state data partitions and (ii) the archived data sub-partitions.

The techniques depicted in FIG. 7 can also include maintaining the inverted index and/or postings list for each distinct item of data in the on-disk corpus, wherein the inverted index and/or postings list of a given item of data contains a list of one or more record identifiers associated with document versions that contain the given item of data.

Also, an additional embodiment of the invention includes organizing an on-disk corpus of multiple data index structures to support one or more queries over temporally evolving data, wherein the multiple data index structures comprise at least (i) a data item birth-time index, (ii) a data item death-time index, and (iii) an inverted index and/or postings list per keyword; partitioning each of the multiple data index structures into (i) an active and/or latest state data partition and (ii) an archived data partition; and sub-partitioning each of the archived data partitions into multiple sub-partitions based on an approximate lifespan of each item of the archived data. Such an embodiment further includes executing a search query that includes (i) one or more temporal predicates and (ii) one or more keyword predicates across the on-disk corpus by: pruning a collection of identified items of data from the on-disk corpus that contain the one or more keyword predicates using range metadata associated with the one or more temporal predicates to generate a pruned list of data items; and performing a list intersection operation on at least (i) the data item birth-time index and (ii) the data item death-time index to generate a list of common data items from the pruned list of data items. Additionally, such an embodiment includes retrieving the common data items from one or more of (i) the active and/or latest state data partitions and (ii) the archived data sub-partitions.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 8:
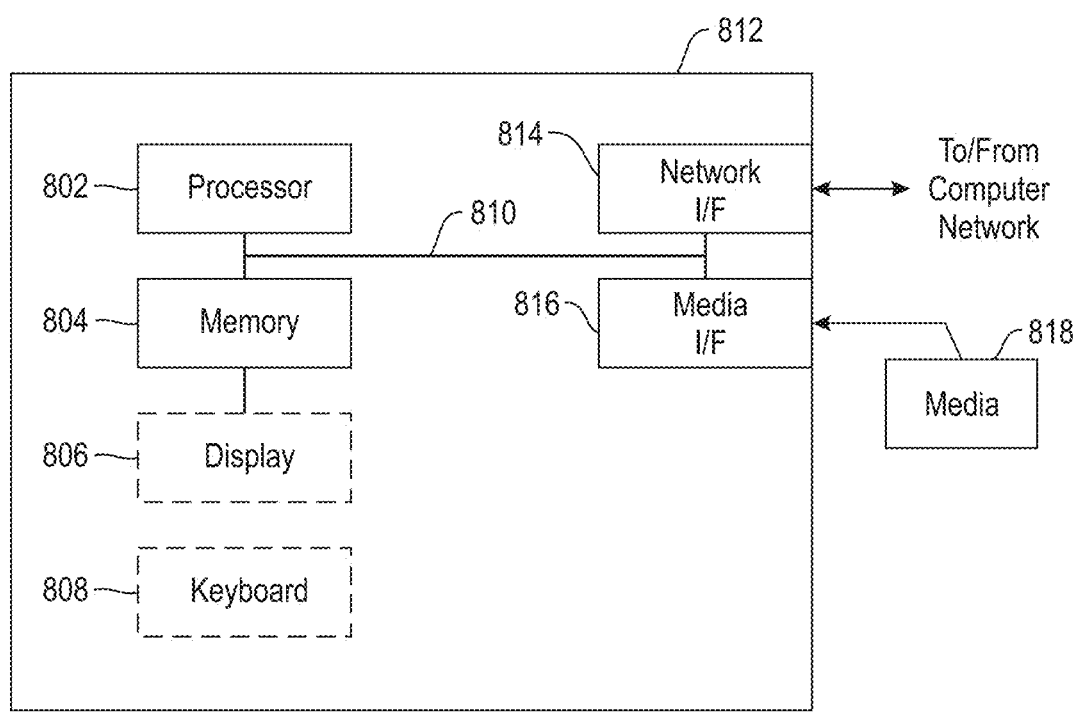
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, designing and implementing an index layout that can efficiently support a wide range of query classes in time-travel text search applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   organizing an on-disk corpus of multiple data index structures to support one or more queries over temporally evolving data, wherein the multiple data index structures comprise at least (i) a data item birth-time index, (ii) a data item death-time index, and (iii) an inverted index and/or postings list per keyword;
   partitioning each of the multiple data index structures into (i) an active and/or latest state data partition and (ii) an archived data partition;
   sub-partitioning each of the archived data partitions into multiple sub-partitions based on a lifespan of each item of the archived data;
   executing a search query that includes (i) one or more temporal predicates and (ii) one or more keyword predicates across the on-disk corpus by:
      pruning a collection of identified items of data from the on-disk corpus that contain the one or more keyword predicates using range metadata associated with the one or more temporal predicates to generate a pruned list of data items; and
      performing a list intersection operation on at least (i) the data item birth-time index and (ii) the data item death-time index to generate a list of common data items from the pruned list of data items; and
   retrieving the common data items from one or more of (i) the active and/or latest state data partitions and (ii) the archived data sub-partitions.

2. The method of claim 1, wherein the multiple sub-partitions of the archived data are formed by partitioning a historic time-span encompassing the archived data into a logarithmic number of disjoint partitions comprising successive partitions catering to archived data items which have lifespan values existing within an exponentially increasing lifespan range.

3. The method of claim 1, wherein said partitioning each of the multiple data index structures comprises placing each item of data in the on-disk corpus in exactly one partition.

4. The method of claim 1, wherein the multiple archived data sub-partitions comprise a number of sub-partitions such that each of the multiple sub-partitions cover a lifespan range to match an expected lifespan distribution of the data in the on-disk corpus.

5. The method of claim 1, wherein the range metadata associated with the one or more temporal predicates comprise a minimum data item identifier and a maximum data item identifier, wherein data item identifiers are assigned within the on-disk corpus in increasing order of birth-time of the data item and/or in increasing order of death-time of the data item.

6. The method of claim 1, comprising:
maintaining the inverted index and/or postings list for each distinct item of data in the on-disk corpus, wherein the inverted index and/or postings list of a given item of data contains a list of one or more record identifiers associated with document versions that contain the given item of data.

7. The method of claim 1, wherein said partitioning each of the multiple data index structures comprises forming the partitions around successive levels of an interval tree, wherein the interval tree comprises a data-structure used to represent data item lifespans.

8. The method of claim 1, wherein the lifespan of each item of the archived data comprises an exact lifespan.

9. The method of claim 1, wherein the lifespan of each item of the archived data comprises an approximate lifespan.

10. A computer program product, the computer program product comprising a computer readable storage medium having program instructions embodied therewith, the program instructions executable by a computing device to cause the computing device to:
organize an on-disk corpus of multiple data index structures to support one or more queries over temporally evolving data, wherein the multiple data index structures comprise at least (i) a data item birth-time index, (ii) a data item death-time index, and (iii) an inverted index and/or postings list per keyword;
partition each of the multiple data index structures into (i) an active and/or latest state data partition and (ii) an archived data partition;
sub-partition each of the archived data partitions into multiple sub-partitions based on a lifespan of each item of the archived data;
execute a search query that includes (i) one or more temporal predicates and (ii) one or more keyword predicates across the on-disk corpus by:
pruning a collection of identified items of data from the on-disk corpus that contain the one or more keyword predicates using range metadata associated with the one or more temporal predicates to generate a pruned list of data items; and
performing a list intersection operation on at least (i) the data item birth-time index and (ii) the data item death-time index to generate a list of common data items from the pruned list of data items; and
retrieve the common data items from one or more of (i) the active and/or latest state data partitions and (ii) the archived data sub-partitions.

11. The computer program product of claim 10, wherein the multiple sub-partitions of the archived data are formed by partitioning a historic time-span encompassing the archived data into a logarithmic number of disjoint partitions comprising successive partitions catering to archived data items which have lifespan values existing within an exponentially increasing lifespan range.

12. The computer program product of claim 10, wherein the lifespan of each item of the archived data comprises an exact lifespan.

13. The computer program product of claim 10, wherein the lifespan of each item of the archived data comprises an approximate lifespan.

14. A system comprising:
a memory; and
at least one processor coupled to the memory and configured for:
organizing an on-disk corpus of multiple data index structures to support one or more queries over temporally evolving data, wherein the multiple data index structures comprise at least (i) a data item birth-time index, (ii) a data item death-time index, and (iii) an inverted index and/or postings list per keyword;
partitioning each of the multiple data index structures into (i) an active and/or latest state data partition and (ii) an archived data partition;
sub-partitioning each of the archived data partitions into multiple sub-partitions based on a lifespan of each item of the archived data;
executing a search query that includes (i) one or more temporal predicates and (ii) one or more keyword predicates across the on-disk corpus by:
pruning a collection of identified items of data from the on-disk corpus that contain the one or more keyword predicates using range metadata associated with the one or more temporal predicates to generate a pruned list of data items; and
performing a list intersection operation on at least (i) the data item birth-time index and (ii) the data item death-time index to generate a list of common data items from the pruned list of data items; and
retrieving the common data items from one or more of (i) the active and/or latest state data partitions and (ii) the archived data sub-partitions.

15. The system of claim 14, wherein the multiple sub-partitions of the archived data are formed by partitioning a historic time-span encompassing the archived data into a logarithmic number of disjoint partitions comprising successive partitions catering to archived data items which have lifespan values existing within an exponentially increasing lifespan range.

16. The system of claim 14, wherein the lifespan of each item of the archived data comprises an exact lifespan.

17. The system of claim 14, wherein the lifespan of each item of the archived data comprises an approximate lifespan.

* * * * *